F. J. RABBETH.
COFFEE POT.
APPLICATION FILED JULY 7, 1919.
1,343,582.
Patented June 15, 1920.
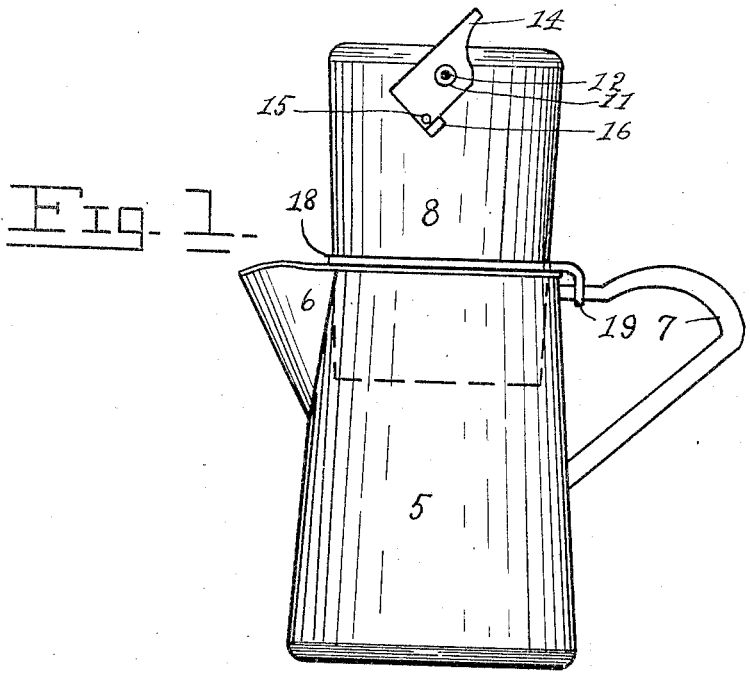
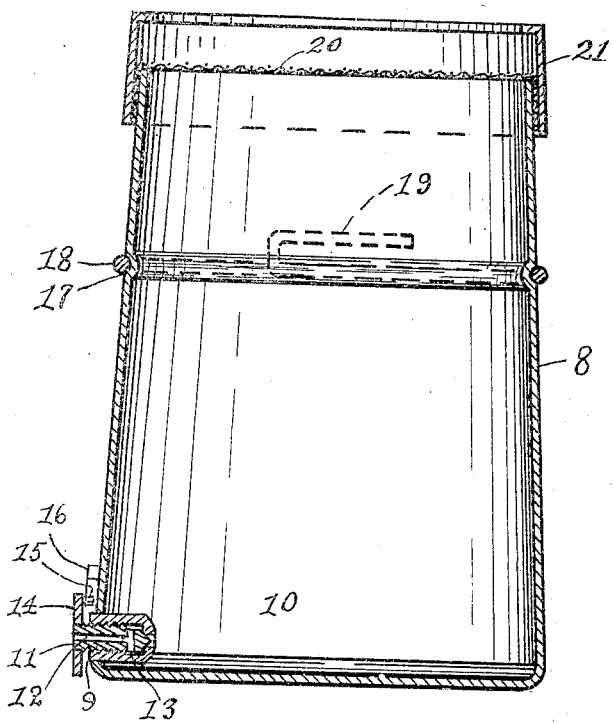
INVENTOR,
F. J. Rabbeth
By [signature]
HIS ATTORNEY.

UNITED STATES PATENT OFFICE.

FRANCIS J. RABBETH, OF REDLANDS, CALIFORNIA.

COFFEE-POT.

1,343,582. Specification of Letters Patent. Patented June 15, 1920.

Application filed July 7, 1919. Serial No. 309,073.

*To all whom it may concern:*

Be it known that I, FRANCIS J. RABBETH, a citizen of the United States, residing at Redlands, in the county of San Bernardino, State of California, have invented new and useful Improvements in Coffee-Pots, of which the following is a specification.

My invention relates to drip coffee pots, and the object thereof is to provide a coffee pot of that class in which it is not possible to position the drip chamber for filling without closing the vent valve. A further object is to provide a locking ring to hold the drip cloth upon the drip chamber and at the same time conceal the edges of the cloth. Another object is to lock the drip chamber to the service chamber to prevent accidental separation.

In the drawings forming a part of this application Figure 1 is a side elevation of my improved pot ready for use. Fig. 2 is an enlarged central section of the drip chamber.

Referring to the drawings 5 is the service chamber and has a pouring spout 6 and a handle 7 shown in the drawings as of usual construction. The drip chamber consists of a tubular casing 8 slightly tapered and closed at its larger end which for distinction is called the bottom. This casing is preferably sheet metal. In the side of this casing adjoining the bottom is a tubular valve casing 9, the inner end of which is closed except at a central port 10. Casing 9 is interiorly threaded for the reception of valve 11 which is adapted to close port 10 when the drip chamber is positioned for filling which is the position shown in Fig. 2. Valve 11 has a longitudinal channel 12 which connects with a transverse channel 13 in the inner reduced end of valve 11. Valve 11 has an operating lever 14 which is so positioned that the bottom edge contacts with the table on which the drip chamber rests when being filled and turns the valve to shut port 10. A screw 15 in lever 14 contacts with lug 16 to prevent the valve from accidentally turning out of casing 9. By removing the screw valve 11 can be unscrewed from casing 9. Toward the top, casing 8 has an annular groove 17 in which is received a spring wire hoop 18, one end of which is turned to form a hook 19. In using my coffee pot I first fill the drip chamber with the required quantity of water and coffee and close the chamber by cloth 20 which is held on the chamber by ring 21. I then invert the service chamber and place it upon the drip chamber and cover ring 21. I then rotate one of the chambers so as to bring hook 19 with a portion above and a portion below a portion of handle 7, which locks the two chambers together. I then turn the chambers to the position shown in Fig. 1 when the liquid drips through cloth 20.

Having described my invention I claim:

1. A drip coffee pot comprising a drip chamber having a closed bottom; a valve casing in the side wall of said chamber near the bottom, said casing having a port in the inner end thereof; a valve in said casing adapted to open or close said port on the rotation thereof; a lever to operate said valve, said lever being so connected that when the closed bottom of said chamber is resting on a table the lever causes the valve to close said port; a drip cloth on the open end of the drip chamber, a ring to hold said cloth positioned; in combination with a service chamber, said chamber having a spout and a handle.

2. A drip coffee pot comprising a drip chamber having a closed bottom; a valve casing in the side wall of said chamber near the bottom, said casing having a port in the inner end thereof; a valve in said casing adapted to open or close said port on the rotation thereof; a lever to operate said valve, said lever being so connected that when said chamber is resting on a table the lever causes the valve to close said port; a drip cloth on the open end of the drip chamber, a ring to hold said cloth positioned; in combination with a service chamber, said chamber having a spout and a handle; and means connected to said drip chamber to engage the handle of the service chamber and secure said chambers against accidental separation.

In witness that I claim the foregoing I have hereunto subscribed my name this 16th day of June 1919.

FRANCIS J. RABBETH.